(12) United States Patent
Jane et al.

(10) Patent No.: US 9,390,461 B1
(45) Date of Patent: Jul. 12, 2016

(54) GRAPHICS HARDWARE MODE CONTROLS

(75) Inventors: Jason P. Jane, Sunnyvale, CA (US);
Richard W. Schreyer, Scotts Valley, CA (US); Michael J. E. Swift, San Francisco, CA (US); Gokhan Avkarogullari, San Jose, CA (US); Luc R. Semeria, Palo Alto, CA (US); Patrick Y. Law, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 836 days.

(21) Appl. No.: 13/466,597

(22) Filed: May 8, 2012

(51) Int. Cl.
*G06F 1/20* (2006.01)
*G06F 1/32* (2006.01)
*G06T 1/20* (2006.01)

(52) U.S. Cl.
CPC ... *G06T 1/20* (2013.01); *G06F 1/32* (2013.01); *G06F 1/3203* (2013.01); *G06F 1/3234* (2013.01); *G06F 1/3246* (2013.01)

(58) Field of Classification Search
None
See application file for complete search history.

(56) References Cited

U.S. PATENT DOCUMENTS

| | | | |
|---|---|---|---|
| 5,921,650 A * | 7/1999 | Doany et al. | 353/31 |
| 5,924,650 A | 7/1999 | Richichi | |
| 6,067,083 A | 5/2000 | Glen et al. | |
| 6,076,171 A | 6/2000 | Kawata | |
| 6,657,634 B1 | 12/2003 | Sinclair et al. | |
| 6,687,844 B1 | 2/2004 | Zhang | |
| 6,820,209 B1 | 11/2004 | Culbert et al. | |
| 6,950,105 B2 | 9/2005 | Giemborek et al. | |
| 7,017,059 B2 | 3/2006 | Law et al. | |
| 7,256,795 B2 | 8/2007 | Chen | |
| 7,451,332 B2 | 11/2008 | Culbert et al. | |
| 7,490,254 B2 | 2/2009 | Clark | |
| 7,500,123 B2 | 3/2009 | Luong et al. | |
| 7,504,800 B2 | 3/2009 | Culbert et al. | |
| 7,529,948 B2 | 5/2009 | Conroy et al. | |
| 7,562,234 B2 | 7/2009 | Conroy et al. | |
| 7,664,970 B2 | 2/2010 | Jahagirdar | |
| 7,730,336 B2 | 6/2010 | Marinkovic et al. | |
| 7,788,516 B2 | 8/2010 | Conroy et al. | |
| 7,802,120 B2 | 9/2010 | Conroy et al. | |
| 7,849,332 B1 | 12/2010 | Alben et al. | |
| 7,861,013 B2 | 12/2010 | Hunkins et al. | |
| 7,903,116 B1 | 3/2011 | Klock et al. | |
| 8,010,822 B2 | 8/2011 | Marshall et al. | |

(Continued)

OTHER PUBLICATIONS

Ryan Smith, "AMD's Radeon HD 6970 & Radeon HD 6950: Paving the Future for AMD," AnandTech, Dec. 15, 2010, 44 pages.

(Continued)

*Primary Examiner* — Maurice L McDowell, Jr.
*Assistant Examiner* — Donna J Ricks
(74) *Attorney, Agent, or Firm* — Meyertons, Hood, Kivlin, Kowert & Goetzel, P.C.; Lawrence J. Merkel

(57) ABSTRACT

In one embodiment, a system controls a duty cycle of a processor (e.g. a graphics processing unit (GPU)) to manage power. The GPU may include a snoop indicator that may control whether or not the GPU captures and/or responds to communications from another processor (e.g. a central processing unit (CPU) that executes a driver associate with the GPU). A snooze indicator may control whether or not the GPU is automatically repowered at the start of the next frame, or is repowered only if the communication indicating additional work has been received. In an embodiment, the GPU mode controls discussed above may permit the GPU firmware executed with the GPU itself to control duty cycle power down, independent of the driver executing on the CPU.

17 Claims, 8 Drawing Sheets

(56) References Cited

U.S. PATENT DOCUMENTS

| | | | |
|---|---|---|---|
| 8,028,185 | B2 | 9/2011 | Branover et al. |
| 8,799,697 | B2 * | 8/2014 | Johnson et al. ............... 713/401 |
| 8,856,566 | B1 | 10/2014 | Jane |
| 8,924,752 | B1 | 12/2014 | Law et al. |
| 2004/0039954 | A1 | 2/2004 | White et al. |
| 2005/0231454 | A1 * | 10/2005 | Alben et al. ................... 345/87 |
| 2007/0067136 | A1 | 3/2007 | Conroy et al. |
| 2007/0206018 | A1 * | 9/2007 | Bajic et al. ................... 345/501 |
| 2007/0238437 | A1 | 10/2007 | Jaakkola |
| 2008/0031279 | A1 | 2/2008 | Hatakeyama |
| 2008/0168285 | A1 * | 7/2008 | de Cesare ............. G06F 1/3203 713/320 |
| 2008/0303833 | A1 * | 12/2008 | Swift et al. ................... 345/505 |
| 2009/0007123 | A1 | 1/2009 | Sreedharan et al. |
| 2009/0222654 | A1 | 9/2009 | Hum et al. |
| 2009/0284534 | A1 * | 11/2009 | Hendry et al. ................ 345/501 |
| 2009/0299543 | A1 | 12/2009 | Cox et al. |
| 2009/0309885 | A1 | 12/2009 | Samson et al. |
| 2010/0103147 | A1 | 4/2010 | Sumpter |
| 2010/0235654 | A1 * | 9/2010 | Malik ................... G06F 1/3209 713/300 |
| 2011/0023040 | A1 | 1/2011 | Hendry et al. |
| 2011/0055596 | A1 | 3/2011 | Wyatt |
| 2011/0106935 | A1 | 5/2011 | Srinivasan |
| 2011/0145619 | A1 | 6/2011 | Ho et al. |
| 2011/0148890 | A1 | 6/2011 | Kaburlasos et al. |
| 2012/0054519 | A1 | 3/2012 | Branover et al. |
| 2012/0146708 | A1 | 6/2012 | Naffziger et al. |
| 2012/0166845 | A1 | 6/2012 | Henry et al. |
| 2013/0021352 | A1 * | 1/2013 | Wyatt et al. ................... 345/520 |
| 2013/0057562 | A1 * | 3/2013 | Nordlund et al. ............. 345/522 |
| 2013/0080816 | A1 | 3/2013 | Johnson et al. |
| 2013/0097448 | A1 * | 4/2013 | Davis et al. ................... 713/323 |
| 2013/0155073 | A1 | 6/2013 | Khodorkovsky et al. |
| 2013/0169656 | A1 * | 7/2013 | Cheng et al. .................. 345/534 |
| 2013/0326250 | A1 | 12/2013 | Sullivan et al. |
| 2013/0328890 | A1 | 12/2013 | Avkarogullari et al. |
| 2014/0344429 | A1 | 11/2014 | Baumann |

OTHER PUBLICATIONS

Josh Yenning, "ATI Mobility Radeon X1600 First Look," AnandTech, Dec. 5, 2005, 3 pages.
Anand Lal Shimpi & Derek Wilson, "ATI Radeon HD 3870 & 3850: A Return to Competition," AnandTech, Nov. 15, 2007, 16 pages.
Matthew Witheiler, "ATI Mobility Radeon 9000: Raising the bar again," AnandTech, Aug. 29, 2002, 12 pages.
Anand Iyer, Cadence Design Systems, Inc., "Demystify power gating and stop leakage cold,"Mar. 3, 2006, EE Times, www.eetimes.com/document.asp?doc_id=1273074, 4 pages.
Office Action from U.S. Appl. No. 13/090,459, mailed Sep. 3, 2013, pp. 1-17.
Office Action from U.S. Appl. No. 13/329,675, issued Feb. 26, 2014, 23 pages.
AMD, FirePro Graphics: AMD PowerTune Technology, May 2011, PowerTune Technology Whitepaper, 9 pages.
W1zzard, Nvidia GeForce GTX Kepler 2 GB Review, Mar. 2012, retrieved from <<http://www.techpowerup.com/reviews/NVIDIA/GeForce_GTX_680/30.html>> on Aug. 7, 2015, 5 pages.
U.S. Appl. No. 14/471,245, filed Aug. 28, 2014, all pages.
Office Action, U.S. Appl. No. 14/471,245, mailed Oct. 22, 2015, 10 pages.
U.S. Appl. No. 14/549,656, filed Nov. 21, 2014, all pages.

* cited by examiner

GRAPHICS HARDWARE MODE CONTROLS

BACKGROUND

1. Field of the Invention

This invention is related to power management in integrated circuits and systems employing integrated circuits.

2. Description of the Related Art

As the number of transistors included on an integrated circuit "chip" continues to increase, power management in the integrated circuits continues to increase in importance. Power management can be critical to integrated circuits that are included in mobile devices such as personal digital assistants (PDAs), cell phones, smart phones, laptop computers, net top computers, etc. These mobile devices often rely on battery power, and reducing power consumption in the integrated circuits can increase the life of the battery. Additionally, reducing power consumption can reduce the heat generated by the integrated circuit, which can reduce cooling requirements in the device that includes the integrated circuit (whether or not it is relying on battery power).

Clock gating is often used to reduce dynamic power consumption in an integrated circuit, disabling the clock to idle circuitry and thus preventing switching in the idle circuitry. Additionally, some integrated circuits have implemented power gating to reduce static power consumption (e.g. consumption due to leakage currents). With power gating, the power to ground path of the idle circuitry is interrupted, reducing the leakage current to near zero.

Power gating can be an effective power conservation mechanism. On the other hand, power gating reduces performance because the power gated circuitry cannot be used until power is restored and the circuitry is initialized for use. The tradeoff between performance (especially perceived performance from the user perspective) and power conservation is complex and difficult to manage.

SUMMARY

In one embodiment, a system includes a power management controller that controls a duty cycle of a processor to manage power. The duty cycle may be the amount of time that the processor is powered on as a percentage of the total time to complete a task. By frequently powering up and powering down the processor during a period of time, the power consumption of the processor may be controlled while providing the perception that the processor is continuously available. For example, the processor may be a graphics processing unit (GPU), and the period of time over which the duty cycle is managed may be a frame to be displayed on the display screen viewed by a user of the system.

Additionally, the processor may support mode controls that may permit additional power savings, in some embodiments. For example, in an embodiment, the processor may be a GPU. The GPU may be powered down based on the duty cycle during a given frame time, and the hardware may support a counter to ensure that the desired off time is met before the GPU is powered back up, in an embodiment. The GPU may include a first mode control (e.g. a snoop indicator) that controls hardware within the GPU that remains powered while the GPU main processing units are powered down. More particularly, the snoop indicator may control whether or not the GPU captures and/or responds to communications from another processor (e.g. a central processing unit (CPU) that executes a driver associated with the GPU) while the GPU main processing units are powered down. Particularly, a communication from the CPU indicating additional work has been queued for the GPU may be captured and/or responded to. A second mode control (e.g. a snooze indicator) may control whether or not the GPU is automatically repowered at the start of the next frame, or is repowered only if the communication indicating additional work has been received.

In an embodiment, the GPU mode controls discussed above may permit the GPU firmware executed with the GPU itself to control duty cycle power down, independent of the driver executing on the CPU. That is, the driver may not be aware of the power down by the GPU. The localization of the duty cycle control to the GPU firmware may reduce software complexity, in some embodiments.

BRIEF DESCRIPTION OF THE DRAWINGS

The following detailed description makes reference to the accompanying drawings, which are now briefly described.

Figure 1:
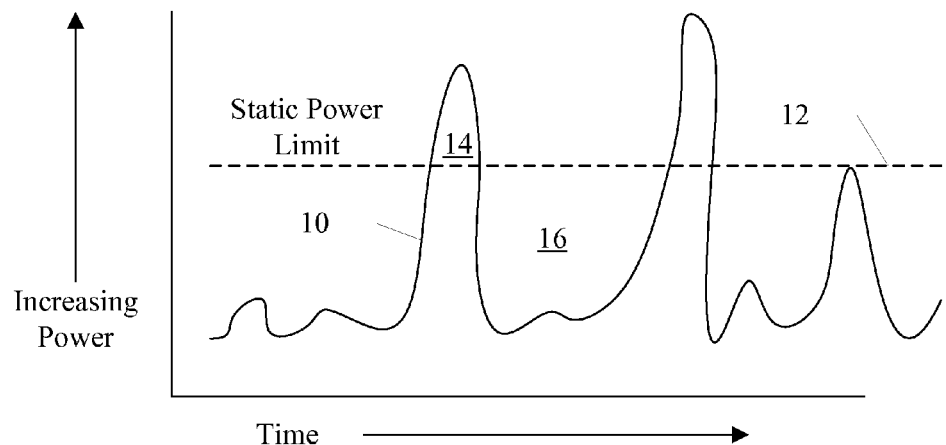
FIG. 1 is a diagram illustrating power consumption over time.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be "configured to" perform the task even when the unit/circuit/component is not currently powered on, because it includes the circuitry that implements the task. In general, the circuitry that forms the structure corresponding to the task may include hardware circuits and/or memory. The memory may store program instructions that are executable to implement the operation. The memory can include volatile memory such as static or dynamic random access memory. Additionally or in the alternative, the memory may include nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Overview

FIG. 1 is a diagram illustrating an example of dynamic power consumption over time in a processor (such as a GPU, for example). The dynamic power wave form 10 may increase at times of higher workload in the GPU, and may decrease at other times when the GPU is not busy. If a static power limit (dotted line 12) were implemented to control temperature and/or power consumption in the system, the performance of the processor would be capped such that its peak power stays under the static limit. That is, the GPU would be throttled, which may result in dropped frames or other visible discontinuities that are undesirable in the user experience. On the other hand, there may be times in which the power consumption is significantly below the limit (e.g. area 16 in FIG. 1).

In one embodiment, a GPU power management controller described below may be configured to manage the duty cycle of a processor to control its power consumption. The GPU power management controller may be configured to permit the processor to temporarily exceed a power budget for the processor, as long as the average power consumed remains within budget. The GPU power management controller may implement a negative feedback loop based on the actual power consumed and the target power, and may use the error between the actual power and target power to control the duty cycle. The error in the case that the actual power is lower than the target power may be used for bursts of high power consumption when the workload of the GPU increases.

Additionally, the GPU power management controller may include graphics power controller hardware that may be programmed with a variety of mode controls. The mode controls may control the wake up (power up) behavior of the GPU in response to powering down for duty cycle control. For example, if there is no additional work to be performed at the time that the GPU is powered down, the mode controls may be programmed to prevent power up until the GPU driver (executing on the CPU) transmits a kick command indicating that there is new work for the GPU to perform. If there is additional work to perform at the time of power down, the mode controls may be programmed to cause power up at the end of the duty cycle or frame time. Another mode control may be used to control whether or not the graphics power controller hardware (which may remain powered while other parts of the GPU are powered down for duty cycle control) is to capture and/or respond to communications from the GPU driver. Particularly, the graphics power controller hardware may be configured to capture/respond to kick commands.

Some of the embodiments below use a GPU as an example of the processor for which the power management techniques described herein are used. However, other embodiments may implement the techniques with any processor (e.g. a central processing unit (CPU), other special purpose processors such as input/output processors (IOPs), digital signal processors (DSPs), embedded processors, microcontrollers, etc.). Still further, other embodiments may implement the power management to control fixed-function circuitry.

Figure 2:
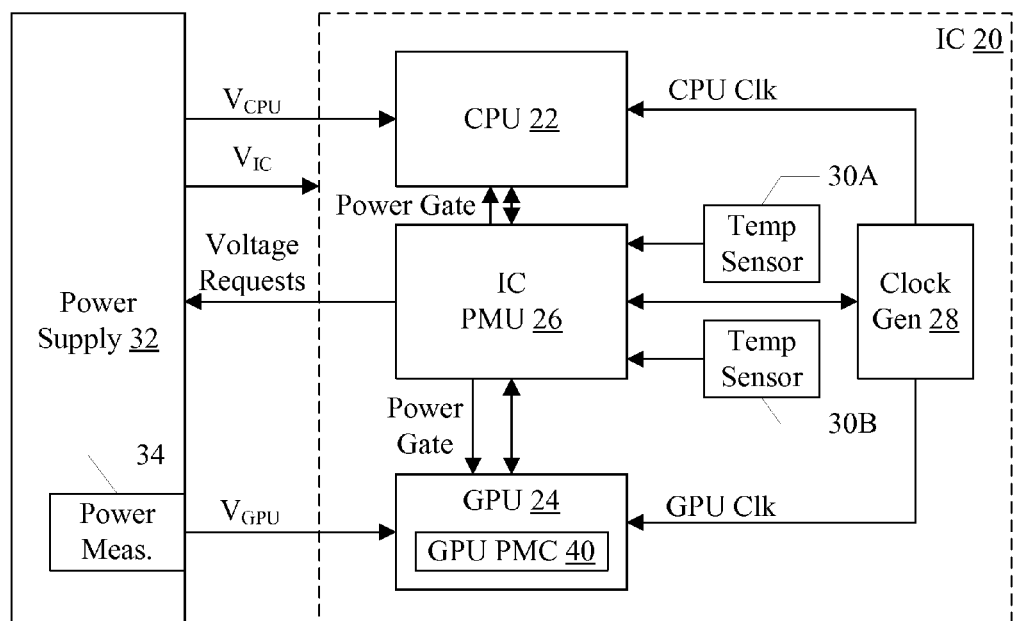
FIG. 2 is a block diagram of one embodiment of a system.

FIG. 2 is a block diagram of one embodiment of a system 18. In the illustrated embodiment, the system 18 includes an integrated circuit (IC) 20 which may be a system on a chip (SOC) in this embodiment. The IC 20 includes various processors such as a CPU 22 and a GPU 24. The IC 20 further includes an IC power management unit (PMU) 26, a clock generator 28, and one or more temperature sensors 30A-30B. The GPU 24 includes a GPU power management controller (PMC) 40. The system 18 also includes a power supply 32, which may include a power measurement circuit 34 on a supply voltage provided to the GPU 24 ($V_{GPU}$ in FIG. 2).

The PMU 26 is configured to generate voltage requests to the power supply 32, which is configured to supply the requested voltages on one or more voltage inputs to the IC 20. More particularly, the PMU 26 may be configured to transmit a request for a desired voltage magnitude (including a magnitude of zero when the corresponding circuitry is to be powered down, in some embodiments). The number of independent voltage inputs supported by the IC 20 may vary in various embodiments. In the illustrated embodiment, the $V_{GPU}$ input is supported for the GPU 24 along with a $V_{GPU}$ input for the CPU 22 and a $V_{IC}$ input for the rest of the integrated circuit 20. Each voltage input may be provided to multiple input pins on the integrated circuit 20 to support enough current flow and power supply voltage stability to the supplied circuitry. Other embodiments may power the CPU with a separate supply but the GPU may receive the $V_{IC}$ supply. Still other embodiments may include other non-CPU voltage supplies besides the $V_{GPU}$ and $V_{IC}$ inputs.

The supply voltage to power-gated circuits such as the GPU 24 may be controlled via voltage requests from the PMU 26, but may also be controlled via power gate controls issued internally by the PMU 26 (e.g. the Power Gate control signals shown in FIG. 2). Gating the power internally may be performed more quickly than issuing voltage requests to the power supply 32 (and powering up may be performed more quickly as well). Accordingly, voltage requests to the power supply 32 may be used to vary the magnitude of the supply voltage (to adjust an operating point of the GPU 24), and the power gating during times that the GPU 24 is sleeping (or off) may be controlled internal to the IC 20.

As mentioned above, the GPU PMC 40 may implement a negative feedback loop to control power consumption in the GPU 24. The GPU PMC 40 may be configured to adjust the duty cycle of the GPU 24 responsive to the error between a target power and the actual power. Generally, the duty cycle may be viewed as a limit to the percentage of time that the GPU 24 is on (not power-gated) in a given period of time. The percentage of time that the GPU 24 is actually on in a given period of time may be the utilization. For example, the duty cycle and utilization may be measured over a frame time, where a frame time is the period of time elapsing for the display of one frame on a display device such as monitor, a touch screen display, etc. Viewed in another way, the utilization may be the ratio of the GPU's powered up time to an overall time for the display of multiple frames. In other embodiments that control other processors or fixed function circuitry, the utilization may similarly be defined as the on time of the controlled circuitry to the total time.

The target power may be determined in a variety of fashions. For example, the target power may be programmed in a register in the GPU PMC 40. Alternatively, the target power may be based on the operating temperature in the system (e.g. as measured by the temperature sensors 30A-30B). In yet another example for a portable system that operates on a limited power supply such as a battery, the target power may be based on the remaining battery life. Combinations of the above factors and/or other factors may be used to determine the target power.

The actual power consumed may be measured (e.g. by the power measurement circuit 34, or by a similar circuit internal to the IC 20). Alternatively, the actual power may be estimated as a function of the activity in the GPU 24 and a profile of the power consumption of various parts of the GPU 24. The profile may be based on simulation of the GPU 24 design and/or based on measurements of the GPU 24 in operation.

Figure 3:
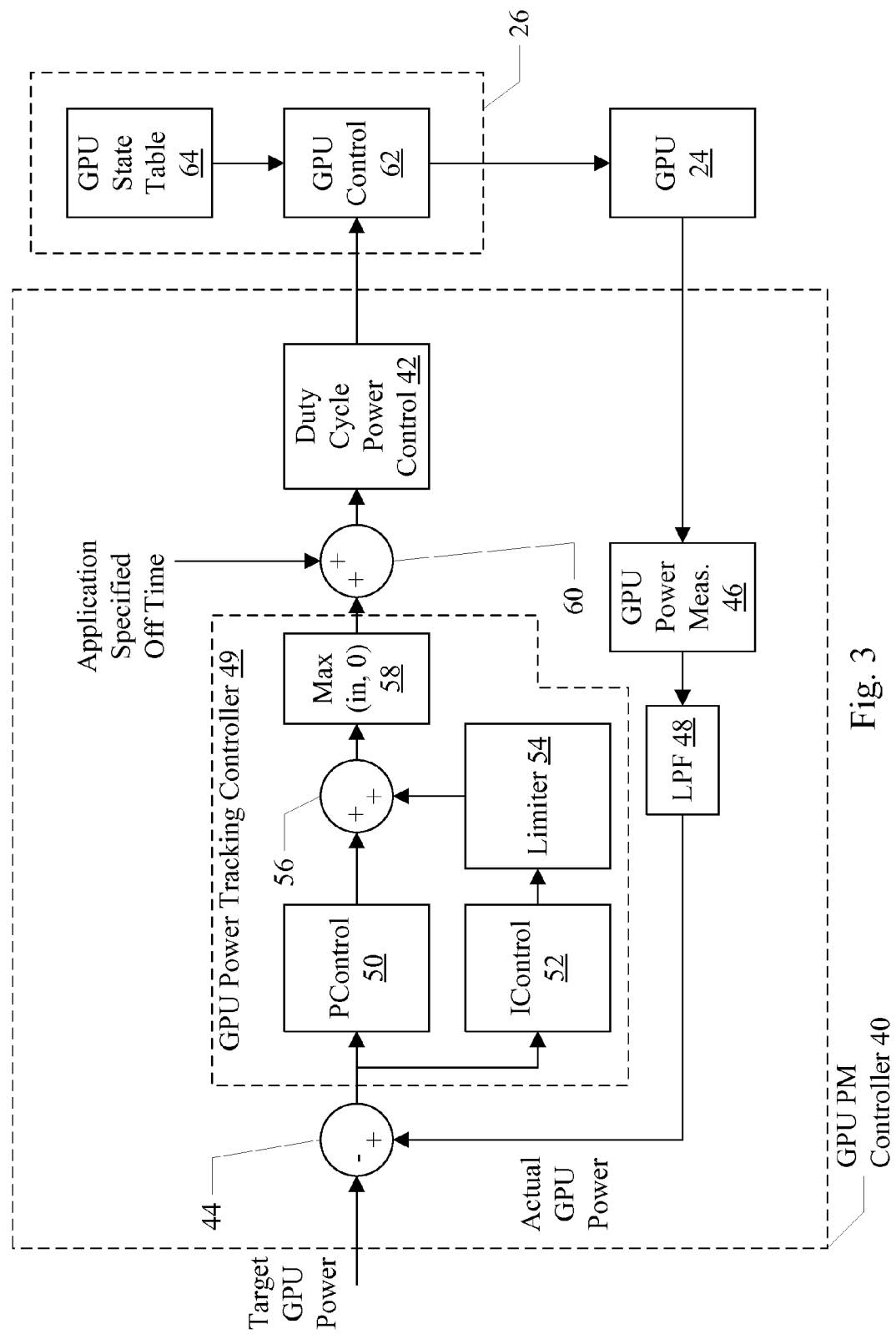
FIG. 3 is a block diagram of one embodiment of a graphics processing unit (GPU) and related power management blocks.

The PMU 26, the GPU PMC 40, and/or various components thereof such as shown in FIG. 3 in an embodiment may be implemented as any combination of hardware circuitry and/or instructions executed on one or more processors such as the CPU 22 and/or the GPU 24. The instructions may be stored on a computer accessible storage medium such as that shown in FIG. 12. Accordingly, a power management unit, power control unit, or power management controller may be any combination of hardware and/or processor execution of software stored on computer accessible storage media, in various embodiments.

The power measurement circuit 34 may, e.g., be configured to measure the current flow on the $V_{GPU}$ supply. Based on the requested voltage, the power consumed in the GPU 24 may be determined either by the power measurement circuit 34 or the PMU 26. The power measurement circuit 34 may, e.g., be readable by software to determine the current/power measurement or may supply the current/power measurement on an input to the IC 20.

The clock generator 28 may supply clocks to the CPU (CPU Clk in FIG. 2), the GPU (GPU Clk in FIG. 2), the PMU 26, and any other circuitry in the IC 20. The clock generator 28 may include any clock generation circuitry (e.g. one or more phase lock loops (PLLs), digital delay lock loops (DLLs), clock dividers, etc.). The clock generator 28 may be programmed by the PMU 26 to set the desired clock frequencies for the CPU clock, the GPU clock, and other clocks.

Together, the supply voltage and clock frequency of a circuit in the IC 20 may be referred to as an operating point for the circuit. The operating point may directly affect the power consumed in the circuit, since the dynamic power is proportional to the frequency and to the square of the voltage. Accordingly, the reduced power consumption in the circuit when both the frequency and the voltage are reduced may be a cubic effect. However, operating point adjustments which change only the frequency or only the voltage may be made also (as long as the circuitry operates correctly at the selected frequency with the selected voltage).

The CPU 22 may be any type of processor and may implement an instruction set architecture. Particularly, the CPU 22 may implement any general purpose instruction set architecture. The CPU 22 may have any microarchitecture, including in-order or out-of-order, speculative or non-speculative, scalar or superscalar, pipelined, multithreaded, etc.

The GPU 24 may implement any graphics application programming interface (API) architecture. The graphics API architecture may define an abstract interface that is specially purposed to accelerate graphics operations. The GPU 24 may further support various languages for general purpose computation (e.g. OpenCL), etc.

The temperature sensors 30A-30B may be any type of temperature sensing circuitry. When more than one temperature sensor is implemented, the temperature sensors may be physically distributed over the surface of the IC 20. In a discrete implementation, the temperature sensors may be physically distributed over a circuit board to which the discrete components are attached. In some embodiments, a combination of integrated sensors within the IC and external discrete sensors may be used.

It is noted that, while the illustrated embodiment includes components integrated onto an IC 20, other embodiments may include two or more ICs and any level of integration or discrete components.

Power Consumption Control

Turning next to FIG. 3, a block diagram of one embodiment of the PMU 26 and the GPU power management controller 40 is shown in greater detail. The GPU 24 is shown as well. In the illustrated embodiment the GPU PMC 40 may include a summator 44 which may receive the actual GPU power from a GPU power measurement unit 46 (through a low pass filter (LPF) 48 in the illustrated embodiment). The output of the summator 44 may be the difference between the actual GPU power and a target GPU power (as illustrated by the plus and minus signs on the inputs), and may be an error in the power tracking. The difference may be input to a GPU power tracking controller 49. In the illustrated embodiment, the GPU power tracking controller 49 may include a proportional controller (PControl) 50, an integral controller (IControl) 52, a limiter 54, a summator 56, and a Max block 58. Thus, in the illustrated embodiment, the GPU power tracking controller 49 may be a proportional-integral (PI) controller. More particularly in the illustrated embodiment, the difference output from the summator 44 may be input to the PControl 50 and the IControl 52. The output of the IControl 52 may be passed through a limiter 54 to a summator 56 which also receives the output of the PControl 50, the output of which may passed through a Max block 58 to ensure that it is greater than zero. The output of the Max block 58 may be added to an application specified off time in the summator 60 to produce a desired duty cycle (or off time). A duty cycle power controller 42 may receive the duty cycle, and may be configured to control the on/off state of the GPU 24 for the frame time responsive to the duty cycle. The duty cycle power controller 42 may communicate with a GPU control unit 62 in the PMU 26, which may power gate the GPU 24 and/or change the GPU 24 to a different operating point in response to duty cycle control. The available operating points may be stored in a GPU state table 64. The GPU control unit 62 in the PMU 26 may include hardware to control the power up/power down state of the GPU, and the duty cycle power controller 42 may be configured to communicate with the PMU hardware to power up/power down the GPU 24. It is noted that the GPU PMC 40 may include hardware components that may be part of the GPU 24. Some of the GPU 24 components may remain powered up when the GPU 24 is powered down for duty cycle control.

The target GPU power input to the GPU PMC 40 may be determined in any desired fashion. As mentioned previously, the target power may be programmed into a register in the GPU 24. The target power may be determined responsive to the temperature measurement from the temperature sensors 30A-30B, for example. The measured temperature may be compared to a target temperature. The resulting temperature difference may be provided to a temperature control unit which may output a target GPU power. In an embodiment, the temperature comparison and target GPU power generation may be implemented in a GPU driver that executes on the CPU 22 during use. Other embodiments may determine the target power in other fashions, e.g. based on battery life, whether or not the system is plugged into a power outlet, etc.

The summator 44 may be the beginning of the negative feedback loop that is configured to track the power error and is configured to attempt to minimize the error of the actual power exceeding the target power. In this embodiment, the actual power may be less than the target power by any amount. Other embodiments may also limit the difference between the actual power and the target power below a lower threshold, for example, to improve performance. In the illustrated embodiment, a proportional-integral (PI) control may be implemented in the GPU power tracking controller 49. The proportional component of the control may be configured to react to the current error, while the integral component may be configured to react to the error integrated over time. More particularly, the integral component may be configured to eliminate the steady state error and control the rate at which the target GPU power is reached. The amount of integral control may be limited through the limiter 54, in some embodiments, as desired. Generally, the gains of both the proportional controller 50 and integral controller 52 may be programmable, as may the limiter 54.

The summator 56 may be configured to sum the outputs of the proportional controller 50 and the limiter 54, generating a value that may be inversely proportional to the duty cycle. The block 58 may ensure that the output is positive, effectively ignoring the case where the actual power is less than the target power. The duty cycle power controller 42 may convert the value to the duty cycle and may control power down of the GPU 24 in response (or the portion of the GPU 24 that is powered down when duty cycle control is active, which may exclude some hardware that is part of the GPU PMC 40 itself). In the illustrated embodiment, the duty cycle power controller 42 may communicate the power down request to the hardware in the GPU control unit 62 to power down the GPU 24 while keeping the GPU PMC 40 hardware powered up.

In some embodiments, there may also be a GPU idle state controlled by the GPU driver executing on the CPU 22. This state may power down the entire GPU 24, including the duty cycle power control hardware. The duty cycle power down/power up cycles may be implemented independent of the GPU driver. That is, the GPU driver may not be "aware" that the GPU has been powered down for the remainder of the frame time due to duty cycle control.

In the illustrated embodiment, the operation of the feedback loop may be exposed to applications. Some applications may attempt to control GPU power consumption at a higher level of abstraction, and the applications' efforts may interfere with the operation of the GPU PMC 40. By providing exposure to the application, the GPU PMC 40 may permit the application to have an effect on loop operation and thus the application developer may no longer include application-level efforts to control GPU power. In other embodiments, application input may not be provided and the summator 60 may be eliminated. In the illustrated embodiment, the application may specify an off time for the GPU during a given frame time.

While PI control is shown in FIG. 3 for the GPU power tracking controller 49, other embodiments may implement other control units such as including derivative control (PID), or any other subcombination of proportional, integral, and derivative control. Still further, any other control design may be used (e.g. table based).

The GPU control unit 62 may be configured to adjust the operating point of the GPU 24 based on the utilization of the GPU 24. The utilization of the GPU 24 may be viewed as the percentage of a frame time that the GPU 24 is powered up and operating. The duty cycle indicated by the duty cycle power controller 42 may serve as a limit to the utilization in order to meet thermal requirements, battery life requirements, etc. However, the actual utilization may be smaller (e.g. if the GPU 24 is performing relatively simple operations each frame time, the actual utilization may be lower than the duty cycle). If the utilization is lower than the duty cycle, it may still be desirable to reduce the operating point of the GPU 24 to reduce power consumption, increasing the utilization. The duty cycle may vary between 100% (no throttling by the duty cycle power controller) and a lower limit within the range of duty cycles. For example, the lower limit may be about 70% of the frame time. If the utilization is lower than a threshold amount, the GPU control unit 62 may reduce the operating point to a lower power state (e.g. lower voltage and/or frequency) to lengthen the utilization but reduce the power consumption. That is, if the utilization is low, then it appears to the control unit 62 that the GPU 24 is finishing it's tasks for the frame rapidly and is sleeping for long periods of time. The GPU 24 may therefore operate at a reduced operating point and may run for longer periods. Similarly, if the utilization is high, then more performance may be needed from the GPU 24. Accordingly, the GPU control unit 62 may increase the operating point up to the limit set by the duty cycle controller.

In FIG. 3, the GPU control unit 62 is shown coupled to the GPU 24. The GPU control unit 62 may actually be coupled to the clock generator 28 (to change GPU clock frequency) and the power supply 32 (to request a different supply voltage magnitude). Additionally, the GPU control unit 62 may control the power gating internal to the IC 20. The GPU control unit 62 may be configured to record the current operating point of the GPU 24, and when the GPU control unit 62 determines that the operating point is to be changed, the GPU control unit 62 may be configured to read the new operating point from the GPU state table 64. That is, the GPU state table 64 may store the permissible operating points for the GPU 24, and the GPU control unit 62 may be configured to select the desired operating point from the operating points listed in the GPU state table 64.

The GPU power measurement unit 46 may be configured to measure the GPU power consumption. In some embodiments, the GPU power measurement unit 46 may receive data from the power measurement circuit 34 to measure the GPU power. In other embodiments, the GPU power measurement unit 46 may estimate the power consumption based on the activity in the GPU 24. For example, the GPU power measurement unit 46 may be configured to read a variety of performance counters in the GPU 24. The values in the performance counters, along with factors derived from simulations of the GPU 24 or direct measurements on an implementation of the GPU 24, may be used to estimate the power consumption. The factors may be programmable in the GPU power measurement unit 46, fixed in hardware, or any combination of programmable and fixed factors.

Figure 4:
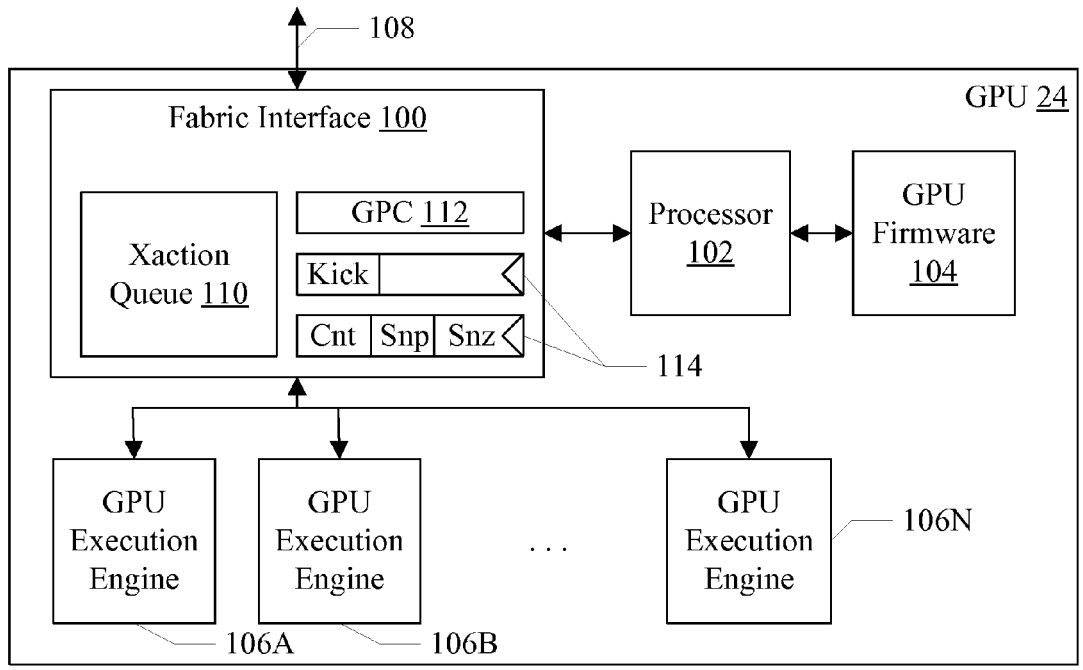
FIG. 4 is a block diagram of one embodiment of the GPU in more detail.

Turning next to FIG. 4, a block diagram of one embodiment of the GPU 24 is shown. In the illustrated embodiment, the GPU 24 includes a fabric interface unit 100, a processor 102, a GPU firmware computer accessible storage medium 104, and a set of GPU execution engines 106A-106N. The GPU execution engines 106A-106N and the processor 102 are coupled to the fabric interface unit 100. The processor 102 is also coupled to the GPU firmware computer accessible storage medium 104. The fabric interface unit 100 is coupled to a fabric interface (arrow 108) to communicate with other portions of the IC 20 such as the CPU 22, the IC PMU 26, etc.

The fabric interface unit 100 is configured to receive transactions from the fabric interface for the GPU 24. The transactions may include commands from the CPU 22, such as the kick command indicating that there is a new task or tasks for the GPU 24 to perform. The transactions may also include responses to read requests transmitted by the GPU 24, to read the task descriptors from memory and/or to read data to be operated upon by the GPU 24. The fabric interface unit 100 may also be configured to transmit the read requests, as well as write requests to write results generated by the GPU 24 to memory. More particularly, the transaction queue 110 may store received transactions to be processed within the GPU 24.

The fabric interface unit 100 may also include a graphics power controller 112 coupled to one or more control registers 114. The graphics power controller 112 may be hardware that implements a portion of the duty cycle power controller 42. The remainder of the duty cycle power controller 42 may be implemented in the firmware stored in the GPU firmware computer accessible storage medium 104 and executed in the processor 102. The graphics power controller 112 may monitor the off portion of the duty cycle, determining when the duty cycle ends, and may control when the GPU 24 is powered up again responsive to mode controls stored in the registers 114. The mode controls may be written by the firmware executed by the processor 102, for example.

In the illustrated embodiment, the mode controls include a count (Cnt), a snoop indicator (Snp), and a snooze indicator (Snz). The count may be generated responsive to the duty cycle, and may be a measure of the amount of off time for the GPU 24. The count may be measured in clock cycles of the GPU, for example, and may be the number of clock cycles in the off time calculated by the GPU power tracking controller 49. Thus, the count may be modified on a frame time by frame time basis, as the duty cycle is determined. In other embodiments, the count may be measured in terms of any clock that may be available to the graphics power controller 112 during times that the GPU 24 is powered down. The graphics power controller 112 may update the count and monitor the count for expiration to determine that the duty cycle/frame time has ended.

The snoop indicator may control whether or not the graphics power controller 112 is to detect/record kick commands. As mentioned previously, kick commands may be used by the GPU driver executing on the CPU 22 to communicate that work is available for the GPU. If the snoop indicator is in a first state, the graphics power controller 112 may record the commands. In a second state, the graphics power controller 112 may not record the commands. The first state may be the set state of a bit and the second state may be the clear state, in an embodiment. Alternatively, the opposite meanings may be assigned to the set/clear states or multiple bit indications may be used. For example, the snoop indicator may include encodings to record the commands as well as encodings indicating whether or not an address communicated with the commands is to be recorded (e.g. an address at which a descriptor describing the work is stored). The kick commands may be recorded, e.g. in the kick indicator in the registers 114. The kick indicator may be a bit that may be set to indicate that a command has been received and clear to indicate that no command has received, or vice versa. Alternatively, the kick indicator may be a count indicating the number of commands.

In some embodiments, there may be a response expected from the GPU 24 for a kick command. The graphics power controller 112 may be configured to generate the response, and the fabric interface unit 110 maybe configured to transmit the response on the communication fabric.

The snooze indicator may control whether or not the graphics power controller is to power up (or wake) the GPU 24 at the expiration of the count (e.g. the end of the duty cycle/frame time) if there have been no kick commands detected during the off time. For example, if there was still work remaining when the GPU 24 was powered down, the snooze indicator may be set for automatic wake. If there was no work remaining when the GPU was powered down, the snooze indicator may be set for wake only if kick command(s) have been detected. In an embodiment, the snooze indicator may be a bit indicating wake if kick when set, or automatic wake when clear. Other embodiments may use the opposite meanings of the set and clear states, or multi bit indicators.

In an embodiment, the fabric interface unit 100 may remain powered while the remainder of the GPU is powered down for duty cycle power down events. Thus, the processor 102 and the GPU execution engines 106A-106N may be powered down. The combination of the GPU firmware and the graphics power controller 112 may implement the GPU PMC 40 of FIG. 3.

The processor 102 may be configured to execute the firmware from the GPU firmware computer accessible storage medium 104. The computer accessible storage medium 104 may be any type of storage medium, including the types described below with respect to FIG. 12. Particularly, in an embodiment, the computer accessible storage medium 104 may be any type of non-volatile memory, including Flash memory, various programmable read-only memories, etc. Volatile memory (e.g. random access memory) may also be used, if the firmware is loaded into the memory at the time the system is booted and the memory is powered during duty cycle power down events. In another embodiment, the firmware may be executed by the GPU execution engines 106A-106N.

In an embodiment, the processor 102 may be a microcontroller. A microcontroller may be a processor that also includes specific interfaces to more easily embed within a device, such as the GPU 24. For example, in the embodiment of FIG. 4, the microcontroller may include a non-volatile memory interface (e.g. a Flash memory interface) and an interface to the fabric interface unit 100. CPUs, by way of contrast, typically include a general bus interface rather than specific interfaces for a specific implementation.

The GPU execution engines 106A-106N may be execution hardware configured to perform various graphics processing operations. For example, the execution engines 106A-106N may include unified shaders (vertex and pixel), pixel shaders, vertex shaders, texture processing units, rasterizers, etc. The GPU execution engines 106A-106N may also execute compute programs (e.g. compute kernels). There also may be various caches (not shown in FIG. 4), which may be powered down when the GPU execution engines 106A-106N are powered down.

Figure 5:
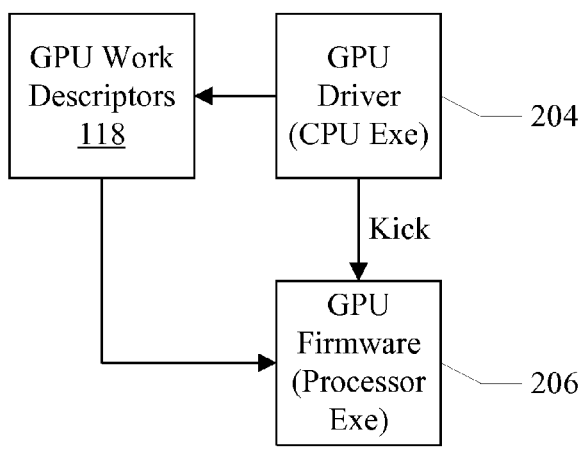
FIG. 5 is a block diagram of one embodiment of a portion of a software infrastructure related to the GPU.

Turning next to FIG. 5, a block diagram illustrating communication between the GPU driver 204 (executed by the CPU 22) and the GPU firmware 206 (executed by the processor 102) is shown for one embodiment. The GPU driver 204 may generate one or more GPU work descriptors 118. The work descriptors 118 may be data structures in memory, and may describe the tasks to be performed by the GPU 24. For example, the data structures may include pointers to objects in memory that are to be rendered into a frame buffer for display on a display screen. The GPU driver 204 may complete one or more work descriptors 118, and may generate a kick command to the GPU 24 to indicate that the work descriptors 118 are available. In response to the kick command, the GPU firmware may read the GPU work descriptors from memory and may cause the GPU 24 to perform the desired processing. In some embodiments, the kick command may include the address of the work descriptors 118. In other embodiments, the work descriptors 118 may be stored at a predefined address that the GPU firmware 206 may read. In other embodiments, the work descriptors 118 may be encoded as part of the kick command itself.

The memory storing the GPU work descriptors 118 and the GPU driver 204 may be internal or external to the IC 20 in various embodiments. In one implementation, the memory may be external to the IC 20 (e.g. one or more dynamic random access memories (DRAMs)), and there may be an memory controller internal or external to the IC 20 to communicate with the external memory on behalf of the GPU 24, the CPU 22, and any other devices/components included in the IC 20 that use memory.

Figure 6:
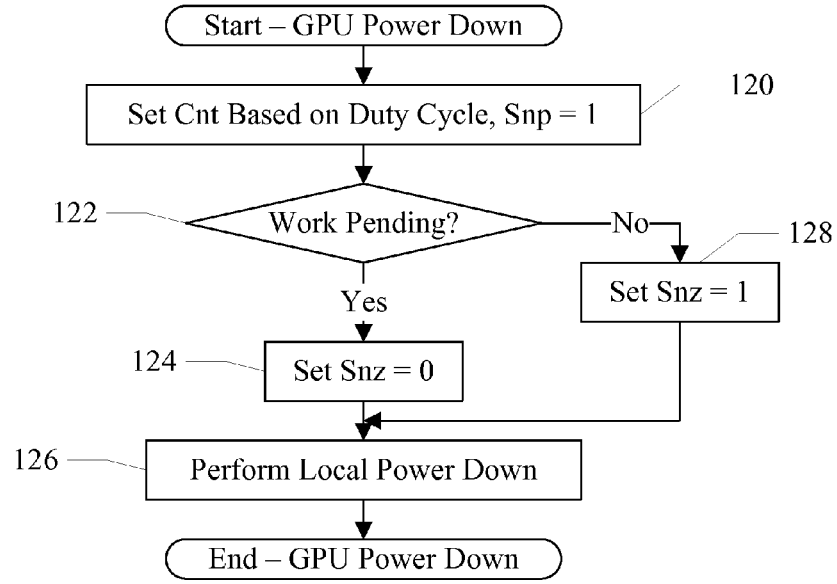
FIG. 6 is a flowchart illustrating one embodiment of GPU firmware to power down the GPU independent of the GPU driver executing on a central processing unit (CPU).

Turning now to FIG. 6, a flowchart is shown illustrating operation of one embodiment of the GPU firmware 206, executed on the processor 102, to power down the GPU for duty cycle control independent of the GPU driver 204. While the blocks are shown in a particular order for ease of understanding, other orders may be used. The GPU firmware 206 may include instructions which, when executed by the processor 102, may cause the GPU to implement the operation shown in FIG. 6.

The GPU firmware 206 may calculate the count based on the duty cycle determined by the GPU power tracking controller 49 (which may also be implemented in the GPU firmware 206, in one embodiment), the frame time, and the frequency of the clock used to update the count. The GPU firmware 206 may write the control registers 114 with the count and may set the snoop indicator to cause the graphics power controller 112 to capture/record the kick commands during the power down time (block 120).

If there is still work pending for the GPU 24 to complete (e.g. one or more work descriptors 118 include a task or tasks which remain to be completed or have not yet been started) (decision block 122, "yes" leg), the GPU firmware 206 may clear the snooze indicator (block 124). In this embodiment, the snooze indicator being clear indicates that the GPU 24 is to wake up automatically at the expiration of the count. The GPU firmware 206 may perform a local power down (block 126). The local power down may be performed without communication to the GPU driver 204. For example, the local power down may include communicating with the IC PMU hardware to power gate the GPU 24 (except for the fabric interface unit 100).

On the other hand, if there is no work pending for the GPU to complete (decision block 122, "no" leg), the GPU firmware 206 may set the snooze indicator (block 128). In this embodiment, the snooze indicator being set may indicate that the GPU 24 is to wake up at the expiration of the count only if one or more kick commands have been detected during the power down time (indicating that new work has been prepared for the GPU 24). The GPU firmware 206 may perform the local power down (block 126).

Figure 7:
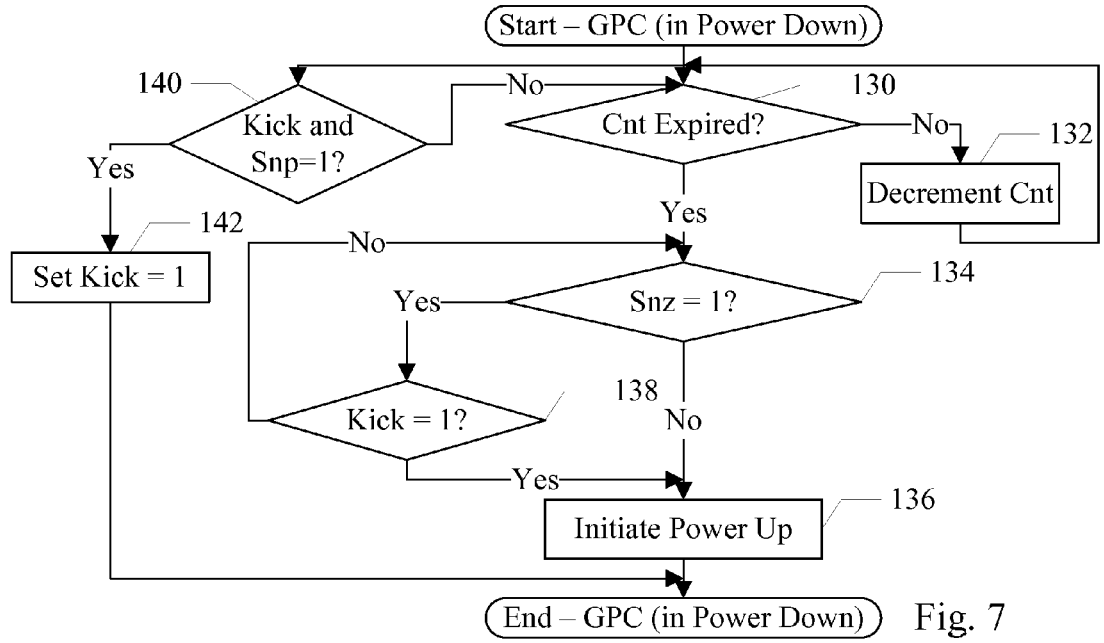
FIG. 7 is a block diagram illustrating operation of one embodiment of graphics power control hardware within one embodiment of the GPU during a times that the GPU is powered down.

FIG. 7 is a flowchart illustrating operation of one embodiment of the graphics power controller 112 while other portions of the GPU 24 are powered down. While the blocks are shown in a particular order for ease of understanding, other orders may be used. Blocks may be performed in parallel in combinatorial logic in the graphics power controller 112. Blocks, combinations of blocks, and/or the flowchart as a whole may be pipelined over multiple clock cycles. The graphics power controller 112 may be configured to implement the operation illustrated in FIG. 7.

If the count is not expired (decision 130, "no" leg), the graphics power controller may decrement the count (block 132). The count may expire at zero in this embodiment. Other embodiments may increment a counter and compare the counter to the count value to detect an expired count. In some embodiments, the GPU firmware 206 may implement a power down state in response to completing all outstanding work by initializing the count to zero and setting the snooze indication. Such a configuration will cause the GPU 24 to remain powered down until a kick command is received, indicating that new work is available.

If the count is expired (decision block 130, "yes" leg), and the snooze indicator is clear (decision block 134, "no" leg), the graphics power controller 112 may be configured to initiate power up of the GPU 24 (block 136). Initiating power up may include requesting a power up state from the IC PMU 26 for the portion of the GPU 24 that is powered down (e.g. processor 102 and the GPU execution engines 106A-106N in FIG. 4). If the count is expired (decision block 130, "yes" leg), the snooze indicator is set (decision block 134, "yes" leg), and at least one kick command has been recorded (e.g. kick indicator is set—decision block 138, "yes" leg), the graphics power controller 112 may also be configured to initiate power up of the GPU 24 (block 136). If the count is expired (decision block 130, "yes" leg), the snooze indicator is set (decision block 134, "yes" leg), and no kick commands have been recorded (e.g. kick indicator is clear—decision block 138, "no" leg), the graphics power controller 112 may continue to await a kick command before initiating power up.

In parallel, the graphics power controller 112 may continue to monitor for the kick command (decision block 140). If a kick command is detected and the snoop bit is set (decision block 140, "yes" leg), the graphics power controller 112 may record the kick command (e.g. setting the kick indicator, block 142). In some embodiments, the graphics power controller 112 may also record an address provided by the kick command (or may record the address provided by the initial kick command, if additional commands are received). In some embodiments, the graphics power controller 112 may be configured to generate a response to the kick command to be transmitted by the fabric interface unit 100 on the communication fabric.

Figure 8:
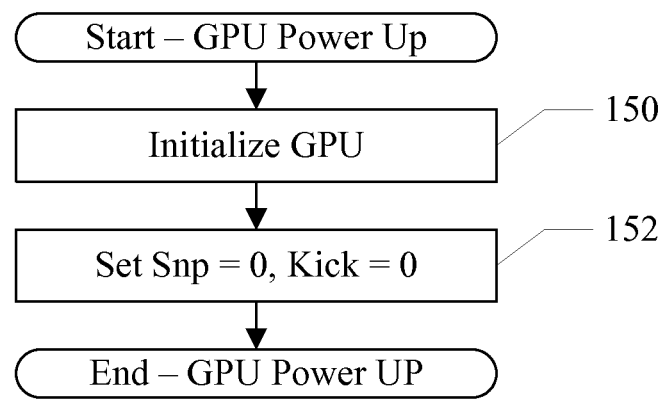
FIG. 8 is a flowchart illustrating operation of one embodiment of the GPU firmware during power up.

Turning next to FIG. 8, a flowchart is shown illustrating operation of one embodiment of the GPU firmware 206 in response to the GPU 24 powering up. While the blocks are shown in a particular order for ease of understanding, other orders may be used. The GPU firmware 206 may include instructions which, when executed by the processor 102, may cause the GPU to implement the operation shown in FIG. 8.

The GPU firmware 206 may initialize the GPU 24 (block 150). The required initialization may be implementation-dependent, but may generally include resetting the GPU execution engines 106A-106N, preparing caches and other memories for use, programming configurable settings, etc. The GPU firmware 206 may also set the snoop indicator to zero, so that the graphics power controller 112 ceases recording/responding to kick commands, and may set the kick indicator to zero as well (block 152).

Figure 9:
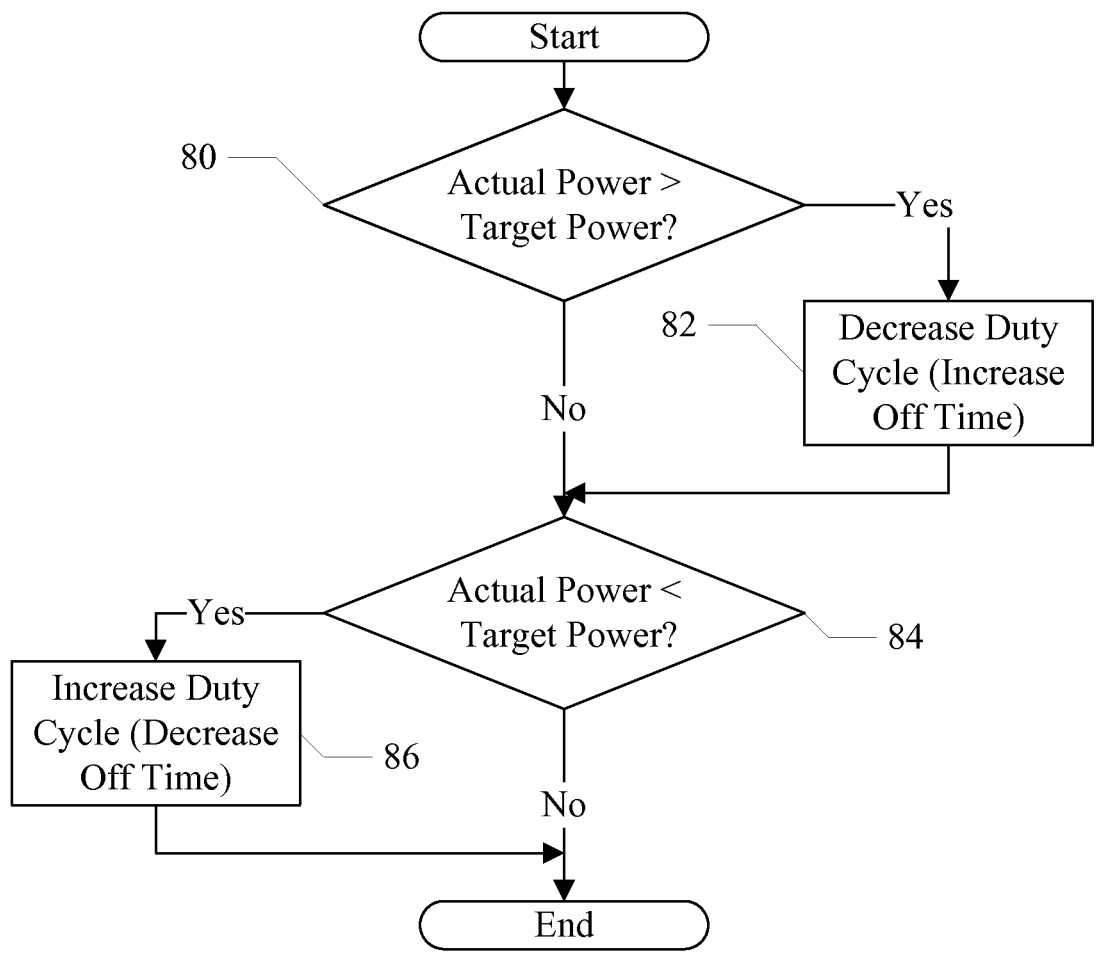
FIG. 9 is a flowchart illustrating operation of one embodiment of a duty cycle controller shown in FIG. 3.

Turning next to FIG. 9, a flowchart is shown illustrating operation of one embodiment of the duty cycle controller (e.g. the combination of the summators 44 and 56, the PControl 50, the IControl 52, the limiter 54, block 58, and the duty cycle power controller 42 in FIG. 3). While the blocks are shown in a particular order for ease of understanding, any order may be used.

If the actual power exceeds the target power (decision block 80, "yes" leg), the duty cycle controller may decrease the duty cycle (i.e. increase the off time) (block 82). The determination of the actual power exceeding the target power may be more than a simple mathematical comparison on the current actual power and the target power. For example, the low pass filter 48 may have captured the lack of power consumption during a time such as the area 16 in FIG. 1, and the actual power may be able to exceed the target power for a period of time to use the "unused" power from the previous low power consumption.

In some embodiments, if the target power is greater than the actual power, the duty cycle controller may not limit the utilization by controlling the duty cycle (e.g. the duty cycle may be increased up to 100%, or the off time may be zero) (decision block 84, "yes" leg and block 86).

Figure 10:
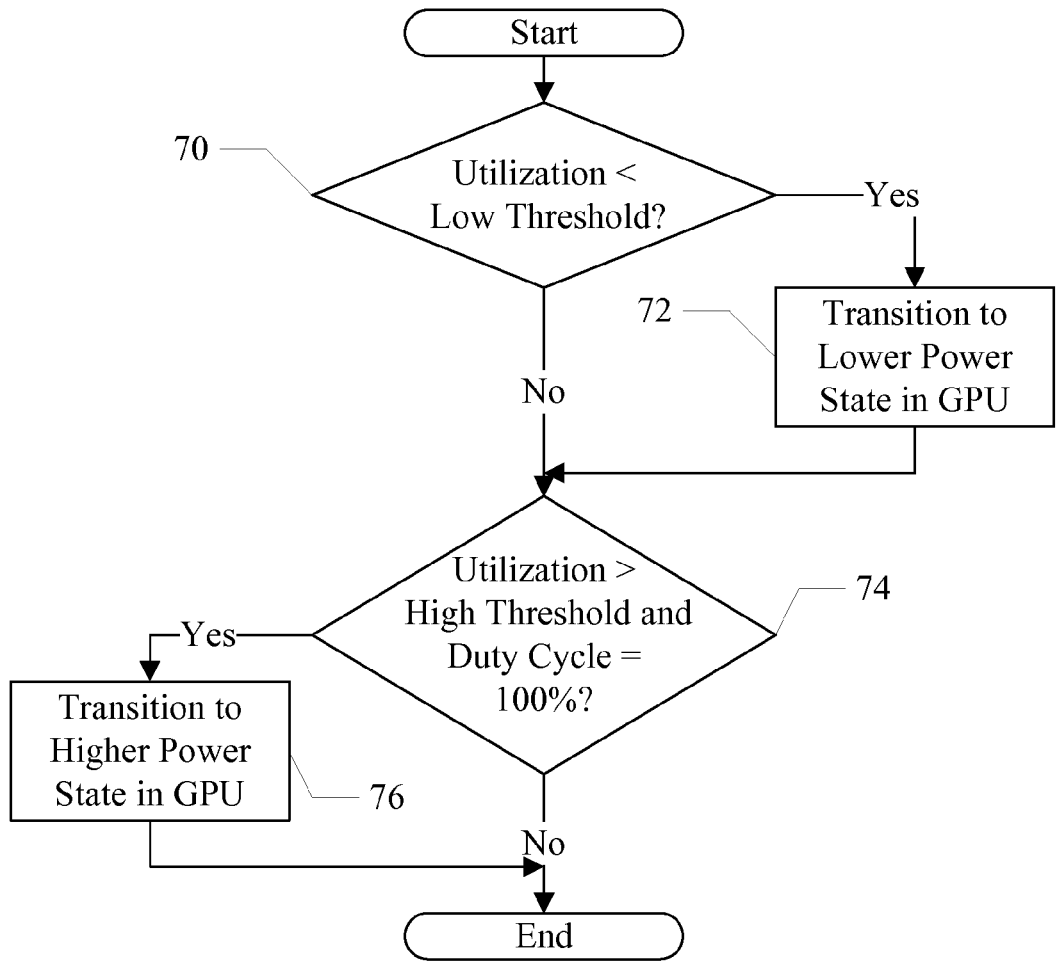
FIG. 10 is a flowchart illustrating operation of one embodiment of a GPU control unit shown in FIG. 3.

Turning next to FIG. 10, a flowchart is shown illustrating operation of one embodiment of the GPU control unit 62. While the blocks are shown in a particular order for ease of understanding, any order may be used. The operation of FIG. 10 may be repeated continuously during use to update the power state of the GPU 24 as it's workload changes over time.

If the utilization of the GPU 24 is less than a low threshold (e.g. 70% in one example) (decision block 70, "yes" leg), the GPU control unit 62 may transition the GPU 24 to a lower power state (block 72). If the utilization of the GPU 24 is greater than a high threshold (e.g. 90% in one example) and the duty cycle is 100% (e.g. no throttling due to thermal limits) (decision block 74, "yes" leg), the GPU control unit 62 may transition the GPU 24 to a higher power state (block 76).

Figure 11:
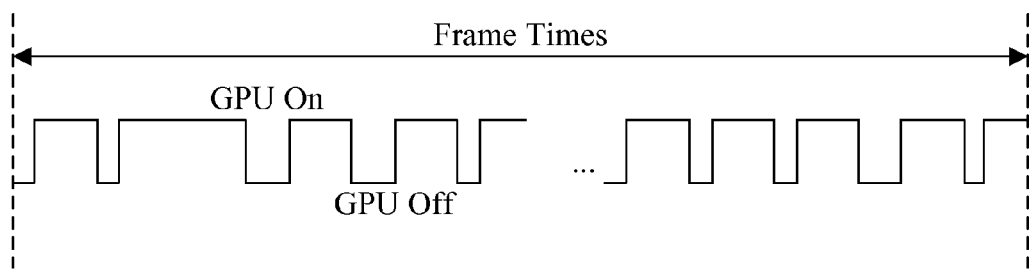
FIG. 11 is a block diagram illustrating one embodiment of duty cycling an on/off state of a GPU.

FIG. 11 is a timing diagram illustrating frame times and GPU on and off times. As can be seen in FIG. 11, the on and off times need not be regular, but rather may vary over the frame times.

Figure 12:
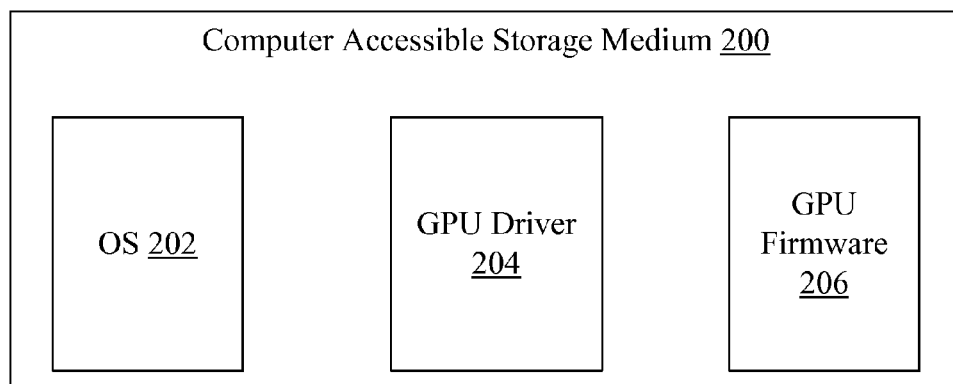
FIG. 12 is a block diagram of one embodiment of a computer accessible storage medium.

Turning now to FIG. 12, a block diagram of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. Storage media may also include non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link.

The computer accessible storage medium 200 in FIG. 12 may store an operating system (OS) 202, the GPU driver 204, and the GPU firmware 206. Each of the operating system 202, the GPU driver 204, and the GPU firmware 206 may include instructions which, when executed in the system 18, may implement the operation described above. In an embodiment, the OS 202 and the GPU driver 204 may be executed on the CPU 22, and the GPU firmware 206 may be executed on the GPU 24 (e.g. on the processor 102). A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A graphics processing unit (GPU) comprising:
a microcontroller;
a firmware storage device coupled to the microcontroller and configured to store a plurality of instructions to be executed by the microcontroller;
a plurality of execution engines configured to perform graphics operations responsive to graphics commands; and
a fabric interface unit configured to couple the GPU to a communication fabric, wherein the fabric interface unit is coupled to the microcontroller and the plurality of execution engines, wherein the fabric interface unit comprises:
a transaction queue configured to store transactions received from the communication fabric;
one or more control registers configured to store mode control values; and
a power control circuit coupled to the transaction queue and the one or more control registers, wherein the power control circuit is configured to cause the microcontroller and the plurality of execution engines to power down responsive to mode control values, and wherein the microcontroller, responsive to executing the plurality of instructions, is configured to program the mode control values in the one or more control registers.

2. The GPU as recited in claim 1 wherein a first transaction on the communication fabric is defined to be a command that indicates to the GPU that a task is available for the GPU, and wherein the power control circuit is configured to detect the command in the transaction queue and to record occurrence of the command in the one or more control registers during a time that the microcontroller is powered down.

3. The GPU as recited in claim 2 wherein the mode control values include a snoop indicator, and wherein the snoop indicator controls whether or not the power control circuit records the command.

4. The GPU as recited in claim 2 wherein the mode control values include a count indicating a power down time and a snooze indicator, and wherein the snooze indicator indicates whether the power control circuit is to automatically power up the microcontroller and the plurality of execution engines at an expiration of the count or the power control circuit is to power up the microcontroller at the expiration of the count only in a case that at least one instance of the command has been received.

5. The GPU as recited in claim 4 wherein the power control circuit is configured to delay the power up responsive to the expiration of the count until the command is received responsive to the snooze indicator indicating that the power control circuit is to power up the microcontroller at the expiration of the count only in the case that at least one instance of the command has been received.

6. A non-transitory computer accessible storage medium storing a plurality of instructions which, when executed by a microcontroller within a graphics processing unit (GPU):
detect that the GPU is to be powered down, except for a fabric interface circuit that couples the GPU to a communication fabric, wherein the fabric interface circuit is coupled to the microcontroller and a plurality of execution engines in the GPU, and the fabric interface circuit includes a power control circuit, a transaction queue configured to store transactions received from the communication fabric, and one or more control registers configured to store mode controls, wherein the GPU is to be powered down due to duty cycle control within a first frame time;

determine whether or not the GPU has additional work to perform prior to powering down; and program a snooze control of the mode controls responsive to whether or not the GPU has additional work, including programming the snooze control to a second state that causes the power control circuit to power up the GPU at an expiration of the duty cycle only in response to receipt of a command during a time that the GPU is powered down, wherein programming the snooze control to the second state is responsive to determining that there is no additional work prior to powering down the GPU.

7. The non-transitory computer accessible storage medium as recited in claim 6 wherein the instructions which, when executed, program the snooze control including instructions which, when executed, program the snooze control to a first state that causes the power control circuit to power up the GPU at an expiration of the duty cycle in response to determining that there is additional work.

8. The non-transitory computer accessible storage medium as recited in claim 6 wherein the plurality of instructions, when executed:

program a snoop control to cause the power control circuit to capture the command during the time that the GPU is powered down.

9. The non-transitory computer accessible storage medium as recited in claim 8 wherein the plurality of instructions, when executed in response to the GPU powering up:

program the snoop control to cause the power control circuit not to capture the command.

10. The non-transitory computer accessible storage medium as recited in claim 8 wherein the plurality of instructions, when executed in response to the GPU powering up:

program the snooze control to a first state that indicates that the GPU is to power up the at the expiration of the duty cycle.

11. The non-transitory computer accessible storage medium as recited in claim 6 wherein the plurality of instructions, when executed:

program a count in the one or more control registers to measure a power down time, wherein a value of the count is dependent on the duty cycle.

12. A method comprising:

detecting that a graphics processing unit (GPU) is to be powered down, except for a fabric interface circuit that couples the GPU to a communication fabric, wherein the fabric interface circuit is coupled to a microcontroller and a plurality of execution engines in the GPU, and the fabric interface circuit includes a power control circuit, a transaction queue configured to store transactions received from the communication fabric, and one or more control registers configured to store mode controls, wherein the GPU is to be powered down due to duty cycle control within a first frame time;

determining whether or not the GPU has additional work to perform prior to powering down; and programming a snooze control of mode controls in the fabric interface circuit responsive to whether or not the GPU has additional work, including programming the snooze control to a second state that causes the power control circuit to power up the GPU at an expiration of the duty cycle only in response to receipt of a command during a time that the GPU is powered down, wherein programming the snooze control to the second state is responsive to determining that there is no additional work prior to powering down the GPU.

13. The method as recited in claim 12 wherein programming the snooze control comprises programming the snooze control to a first state that causes the power control circuit to power up the GPU at an expiration of the duty cycle in response to determining that there is additional work.

14. The method as recited in claim 12 further comprising:

programming a snoop control to cause the power control circuit to capture the command during the time that the GPU is powered down.

15. The method as recited in claim 14 further comprising programming the snoop control to cause the power control circuit not to capture the command in response to the GPU powering up.

16. The method as recited in claim 14 further comprising programming the snooze control to a first state that indicates that the GPU is to power up the at the expiration of the duty cycle in response to the GPU powering up.

17. The method as recited in claim 12 further comprising programming a count in the one or more control registers to measure a power down time, wherein a value of the count is dependent on the duty cycle.

* * * * *